US005417897A

United States Patent [19]

Asakawa et al.

[11] Patent Number: 5,417,897

[45] Date of Patent: May 23, 1995

[54] METHOD FOR FORMING TAPERED INKJET NOZZLES

[75] Inventors: Stuart D. Asakawa, San Diego, Calif.; Paul H. McClelland, Monmouth; Ellen R. Tappon, Corvallis, both of Oreg.; Richard R. Vandepoll, Vancouver, Wash.; Kenneth E. Trueba; Chien-Hua Chen, both of Corvallis, Oreg.

[73] Assignee: Hewlett-Packard Company, Palo Alto, Calif.

[21] Appl. No.: 308,329

[22] Filed: Mar. 19, 1994

Related U.S. Application Data

[62] Division of Ser. No. 59,686, May 10, 1993, Pat. No. 5,378,137.

[51] Int. Cl.[6] ........................ B29C 35/08; B29B 13/08

[52] U.S. Cl. ........................ 264/22; 264/25; 264/154; 264/156; 425/174.4

[58] Field of Search .................. 264/22, 25, 153, 154, 264/156; 156/628, 643, 644, 654; 219/121.71, 121.68, 121.69, 121.73, 121.65, 121.66; 425/174, 174.4; 346/140 R

[56] References Cited

U.S. PATENT DOCUMENTS

| | | | |
|---|---|---|---|
| 3,549,733 | 12/1970 | Caddell | 219/121.69 |
| 4,390,391 | 6/1983 | Fujita et al. | 156/628 |
| 4,558,333 | 12/1985 | Sugitani et al. | 346/140 R |
| 4,940,881 | 7/1990 | Sheets | 219/121.69 |
| 5,061,840 | 10/1991 | Fortney et al. | 219/121.68 |

FOREIGN PATENT DOCUMENTS

| | | | |
|---|---|---|---|
| 0367541 | 9/1990 | European Pat. Off. . | |
| 57-202992 | 12/1982 | Japan | 219/121.68 |
| 3-221279 | 9/1991 | Japan | 219/121.68 |
| 1583192 | 1/1981 | United Kingdom | 219/121.68 |

*Primary Examiner*—Mathieu D. Vargot

[57] ABSTRACT

A single mask is used to form a tapered nozzle in a polymer nozzle member using laser ablation. In one embodiment of the mask, clear portions of the mask, corresponding to the nozzle pattern to be formed, each incorporate a variable-density dot pattern, where the opaque dots act to partially shield the underlying polymer nozzle member from the laser energy. This partial shielding of the nozzle member under the dot pattern results in the nozzle member being ablated to less of a depth than where there is no shielding. By selecting the proper density of opaque dots around the peripheral portions of the mask openings, the central portion of each nozzle formed in the polymer nozzle member will be completely ablated through, and the peripheral portions of the nozzle will be only partially ablated through. By increasing the density of dots toward the periphery of each mask opening, the resulting nozzle may be formed to have any tapered shape. Other mask patterns are also described.

11 Claims, 3 Drawing Sheets

METHOD FOR FORMING TAPERED INKJET NOZZLES

CROSS REFERENCE TO RELATED APPLICATION

This is a divisional of application Ser. No. 08/059,686, filed on May 10, 1993, now U.S. Pat. No. 5,378,137.

FIELD OF THE INVENTION

The present invention generally relates to inkjet printers and, more particularly, to the formation of nozzles in a nozzle member for use with an inkjet printer.

BACKGROUND OF THE INVENTION

Thermal inkjet printers operate by rapidly heating a small volume of ink and causing the ink to vaporize, thereby ejecting a droplet of ink through an orifice to strike a recording medium, such as a sheet of paper. When a number of orifices are arranged in a pattern, the properly sequenced ejection of ink from each orifice causes characters or other images to be printed upon the paper as the printhead is moved relative to the paper.

In these printers, print quality depends upon the physical characteristics of the orifices, or nozzles, in the printhead. For example, the geometry of the nozzles affects the size, shape, trajectory, and speed of the ink drop ejected.

FIG. 1 is a cross-section of a desirable type of thermal inkjet printhead 8. Printhead 8 includes a nozzle member 10, having a tapered nozzle 12. Affixed to a back surface of nozzle member 10 is a barrier layer 14, which channels liquid ink into a vaporization chamber 16. Liquid ink within vaporization chamber 16 is vaporized by the energization of a thin film resistor 18 formed on the surface of a semiconductor substrate 20, which causes a droplet of ink 22 to be ejected from nozzle 12.

Preferably, nozzle member 10 is formed of a polymer material, and nozzle 12 is formed in nozzle member 10 using laser ablation. Nozzle member 10 can also be formed of a photoresist material, where nozzle 12 is formed using photolithographic techniques or other techniques.

Tapered nozzles have many advantages over straight-bore nozzles. A tapered nozzle increases the velocity of an ejected ink droplet. Also, the wider bottom opening in the nozzle member 10 allows for a greater alignment tolerance between the nozzle member 10 and the thin film resistor 18, without affecting the quality of print. Additionally, a finer ink droplet is ejected, enabling more precise printing. Other advantages exist.

If nozzle 12 is to be formed using a laser, a tapered nozzle 12 may be formed by changing the angle of nozzle member 10 with respect to a masked laser beam during the orifice forming process. Another technique may be to use two or more masks for forming a single array of nozzles 12 where each mask would have a pattern corresponding to a different nozzle diameter. Still another technique is to defocus the laser beam during the orifice forming process. European Patent Application 367,541 by Canon describes such a defocusing technique and other techniques for forming tapered nozzles using a laser. U.S. Pat. No. 4,940,881 to Sheets describes still another technique for forming tapered nozzles with a laser by rotating and tilting an optical element between the laser and the nozzle plate. These various techniques are considered time consuming, complicated, and subject to error.

FIG. 2 illustrates a conventional mask portion 24 having an opening 26 corresponding to where a nozzle is to be formed in a nozzle member. The opaque portion 28 of the mask is shown as being shaded. These conventional masks have been used in the past, in conjunction with various laser exposure techniques, for forming straight and single-angled tapered nozzles by controlling the fluence (mj/cm$^2$) of laser radiation at the target substrate.

U.S. Pat. No. 4,558,333 to Sugitani et al. describes a photolithographic process using a single mask to form tapered nozzles in a photoresist. The tapering is due to the opaque portions of the mask causing frustum shaped shadows through the photoresist layer corresponding to where nozzles are to be formed. After developing and etching the photoresist, the resulting nozzles have a frustum shape. The mask used is similar to that of FIG. 2 but where the opaque portion 28 and clear portion 26 are reversed.

This relatively simple method for forming tapered nozzles in photoresist nozzle members, using a single conventional mask, cannot be used for forming tapered nozzles in a polymer nozzle member using laser ablation.

Accordingly, what is needed is a highly reliable method and apparatus for forming tapered nozzles in a polymer nozzle member using laser ablation.

SUMMARY OF THE INVENTION

A novel mask and laser ablation method is described for forming a tapered nozzle in a polymer material, such as Kapton TM, by laser ablation. A single mask forms a tapered nozzle without shifting the angle of the polymer nozzle member relative to any laser radiation source, or without requiring additional masks to form the tapered nozzle, or without moving the image.

In one embodiment of the mask, the clear openings of the mask, corresponding to the nozzle pattern to be formed, each incorporate a variable-density dot pattern, where opaque dots (which may be any shape) act to partially shield the underlying polymer nozzle member from the laser energy. This partial shielding of the nozzle member under the dot pattern results in the nozzle member being ablated to less of a depth than where there is no shielding.

By selecting the proper density of opaque dots around the peripheral portions of the mask openings, the central portion of each nozzle formed in the polymer nozzle member will be completely ablated through, and the peripheral portions of the nozzle will be only partially ablated through. By increasing the density of dots toward the periphery of each mask opening, the resulting nozzle may be formed to a desired shape.

A second embodiment of a mask in accordance with this invention incorporates a variable density of concentric rings of opaque material in the peripheral portion of each of the mask openings. The opaque rings may either have different widths or the same width. The variable degree of shielding of laser energy provided by the rings results in the formation of tapered nozzles.

Other mask patterns are also described.

DETAILED DESCRIPTION OF THE PREFERRED EMBODIMENTS

Figure 3A:
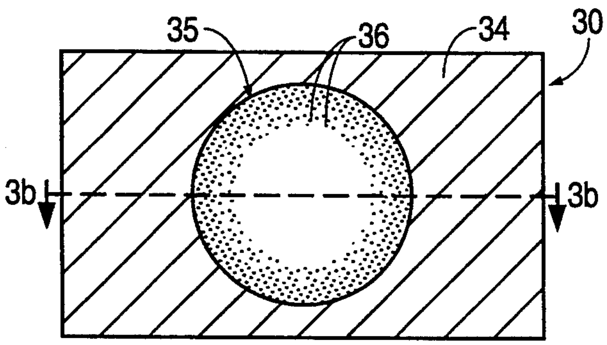
FIGS. 3*a* and 3*b* illustrate one embodiment of a mask in accordance with the invention incorporating variable densities of opaque dots for forming tapered nozzles in a polymer nozzle member using laser ablation.
Figure 3B:
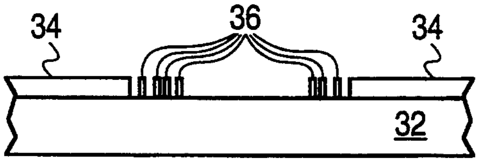

FIG. 3*a* is a top view of a portion of a mask 30 which may be used to form a tapered nozzle in a polymer nozzle member using laser ablation. FIG. 3*b* is a cross-section along line 3*b*—3*b* in FIG. 3*a*.

In a preferred embodiment, mask 30 comprises a clear quartz substrate 32 with a thin layer of opaque material 34 formed over it where it is desired to block or reflect laser light. Opaque material 34 may be a layer of chrome, a UV enhanced coating, or any other suitable reflective or otherwise opaque coating. The type of laser which is preferred for use with the mask of FIG. 3*a* is an excimer laser.

A circular opening 35 in opaque material 34 defines a single nozzle to be formed in a nozzle member.

Opaque dots 36 are distributed within circular opening 35 of mask 30. The distribution of these dots 36 effectively provides variable degrees of shading of the underlying nozzle member from the laser light. The arrangement of mask 30 with respect to a radiation source and a nozzle member is illustrated in FIG. 4, which will be discussed later.

The area of each of dots 36 may be the same or may be variable. The area of a dot 36 should be small enough to not be individually resolved on the underlying nozzle member. Dots 36 may have any shape, such as a circle, a square, or a thin line, and may be formed by conventional photolithographic techniques used to form masks. The desired mask pattern is dependent upon the optical resolution of the system at the specific operating wavelength. For example, for an excimer laser system emitting laser light having a wavelength of 2480 angstroms and a projection lens resolution of 2.0 microns, dots 36 preferable each have a maximum cross-section (i.e., width, diameter, etc.) of approximately 2.5 microns so as to not be individually resolved on the target substrate.

A higher density of dots 36 is shown around the periphery of the circular opening 35 in mask 30 to provide more shading around the periphery of a nozzle to achieve tapering of the nozzle. The arrangement of dots 36 will directly influence the shape of the nozzles in the nozzle member.

Figure 4:
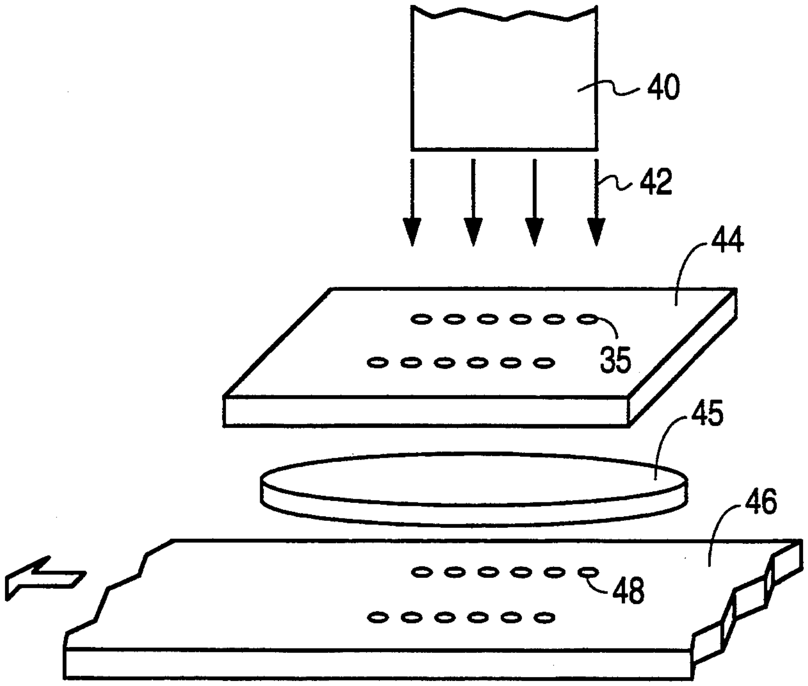
FIG. 4 illustrates a system for exposing a nozzle member material to masked radiation to form tapered nozzles.

FIG. 4 illustrates an optical system 40, such as an excimer laser with beam shaping optics, directing a beam of radiation 42 onto a mask 44. Each opening 35 in mask 44 corresponds to opening 35 in FIG. 3*a*, where dots 36 are distributed as shown in FIG. 3*a*. Laser radiation 42 not blocked or reflected by any opaque portion passes through mask 44 and is transferred by lens system 45 to irradiate a polymer nozzle member 46. In a preferred embodiment, polymer nozzle member 46 comprises a material such as Kapton TM, Upilex TM, or their equivalent and has a thickness of approximately 2 mils.

In a preferred embodiment, the material used for nozzle member 46 is provided on a reel, and this nozzle member material is unreeled from the reel and positioned under the image delivery system comprising mask 44 and lens system 45. The laser within the optical system 40 is then repetitively pulsed for a predetermined amount of time to ablate the nozzle member 46. The length of time the laser is energized, and the distribution of dots 36 on the mask of FIG. 3*a*, determine the geometry of the resulting nozzle 48.

After this ablation step, the nozzle member material is then stepped to a next position, and a new portion of the nozzle member material is unreeled under the image delivery system for laser ablation.

Figure 5A:
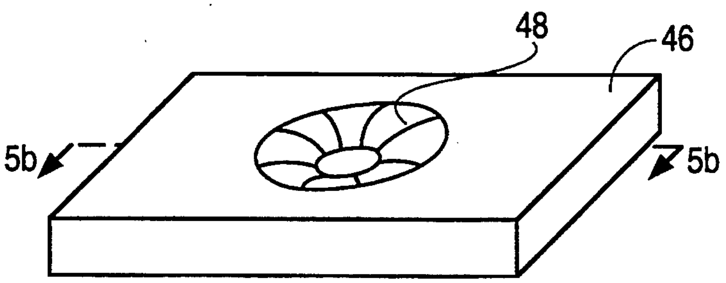
FIG. 5*a* is a perspective view of a tapered nozzle formed in a nozzle member using any of the masks shown in FIGS. 3*a*–8*b*.
Figure 5B:
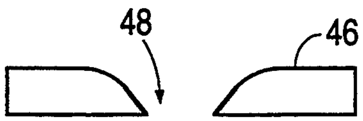
FIG. 5*b* is a cross-section of the nozzle member of FIG. 5*a* along line 5*b*—5*b* illustrating the geometry of the tapered nozzle.

FIGS. 5*a* and 5*b* illustrate a portion of nozzle member 46 and show a single nozzle 48 formed using the mask of FIG. 3*a*. Many variations of nozzle shapes may be formed using the general principles described above. The particular distribution of dots 36 in FIG. 3*a* has been selected to form a variable-slope, tapered nozzle 48 in polymer nozzle member 46. FIG. 5*b* shows a cross-section of the nozzle 48 across line 5*b*—5*b* in FIG. 5*a*.

Figure 1:
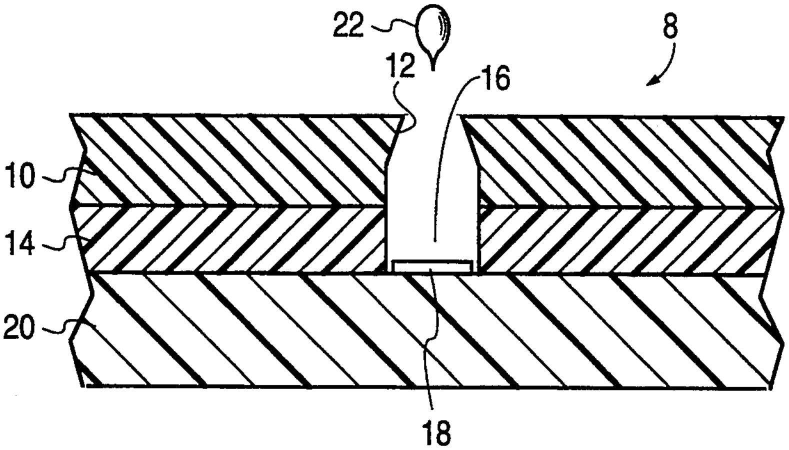
FIG. 1 is a cross-section of a printhead for a thermal inkjet printer incorporating a nozzle member having tapered nozzles.
Figure 2:
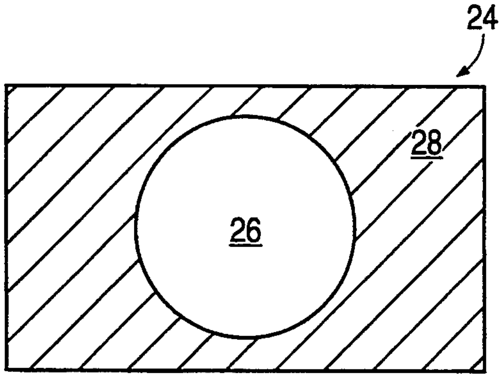
FIG. 2 is a conventional mask which has been previously used to form tapered nozzles in a nozzle member.

The distribution of dots 36 can also be used to form the two-slope tapering of the nozzle shown in FIG. 1, or can be used to form a single, straight slope tapering.

In the preferred method, an excimer laser is used as the radiation source in optical system 40. The laser beam is focused approximately on the nozzle member 46 surface or slightly below the surface and pulsed approximately 300–400 times at a rate of 125 Hz, or whatever is deemed adequate depending upon the energy of the laser and thickness of the nozzle member. A preferred laser energy level is approximately 230 mj for each pulse of laser energy.

In one embodiment, 300 nozzles per inch are formed in nozzle member 46, and each nozzle has an ink exit diameter of 52 microns and an ink entrance diameter of 90 microns.

Mask 30 in FIG. 3*a* may also be used to form a tapered nozzle in a nozzle member formed of a photoresist material using a photolithographic technique. In this photolithographic technique, nozzle member 46 in FIG. 4 would be a layer of Vacrel TM or another photoresist material formed on a substrate. Optical system 40 would include an ultraviolet radiation source with beam shaping optics. Mask 44 in FIG. 4, similar to mask 30 shown in FIG. 3*a*, would then be interposed between the optical system 40, providing ultraviolet radiation 42, and the photoresist. The exposed portion of the photoresist may then be removed in a conventional developing and etching step. The magnitude of the radiation 42 impinging on the photoresist determines the depth of exposure and the depth of etching of the photoresist. Thus, the partial shading of the photoresist by dots 36 enables the photoresist to be etched so as to define tapered nozzles as shown in FIGS. 5*a* and 5*b*.

The above description applies where a positive photoresist is used. If a negative photoresist is used, where the exposed portions of the photoresist are insoluble in a developing solution, then the opaque and clear portions of the mask 44 are reversed.

Accordingly, FIGS. 5*a* and 5*b* illustrate either a polymer nozzle member 46 after laser ablation through mask 44 or a photoresist nozzle member 46 after exposure using mask 44, and after developing and etching.

A laser ablation process is preferred over a photolithographic/photoresist process since the photoresist processes do not provide a stable, uniform pattern over a large area or over a long period of time. The above-described laser ablation process, by virtue of its threshold phenomena and use of pre-polymerized materials, produces highly predictable patterns dependent upon the incident energy per unit area (fluence).

Figure 6A:
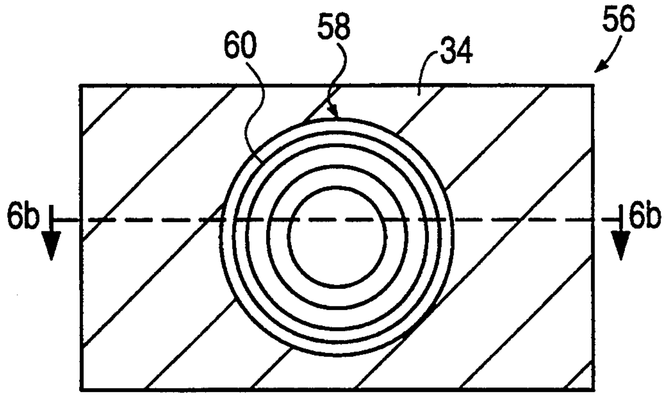
FIGS. 6*a* and 6*b* illustrate a second embodiment of a mask in accordance with the invention incorporating concentric, opaque rings, each having a same width, for forming a tapered nozzle in a polymer nozzle member using laser ablation.
Figure 6B:
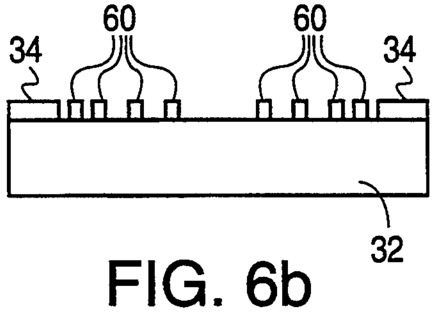

FIGS. 6*a* and 6*b* illustrate a second embodiment of a mask 56 incorporating the concepts used in this invention, where mask opening 58 includes concentric opaque rings 60. FIG. 6*b* is a cross-section of the mask of FIG. 6*a* along line 6*b*—6*b*. In this embodiment, each opaque ring 60 has a same width, but the density of concentric rings 60 decreases with distance from the perimeter of the mask opening 58. Preferably, the width of each of concentric ring 60 is chosen to be small enough so as to not be resolved on the surface of the nozzle member but to only effectively act as variable shading of the radiation energy impinging on the nozzle member.

The shading action of rings 60 in forming a tapered nozzle is similar to that of dots 36 in FIG. 3*a*.

The resulting nozzle may be virtually identical to that shown in FIGS. 5*a* and 5*b*. As with the mask in FIGS. 3*a* and 3*b*, the mask of FIGS. 6*a* and 6*b* may be used to form tapered nozzles in a polymer nozzle member by laser ablation or in a photoresist nozzle member using well known photolithographic techniques.

Figure 7A:
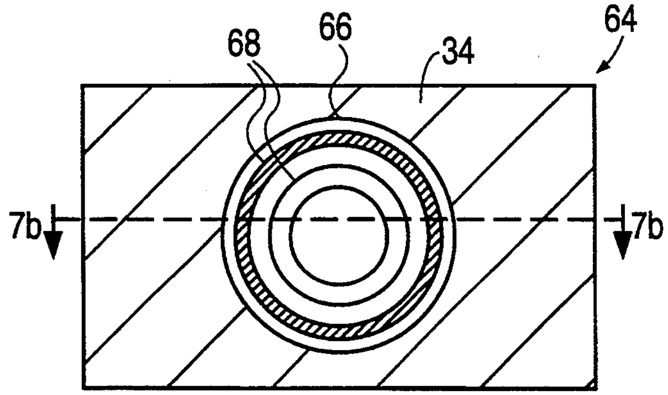
FIGS. 7*a* and 7*b* illustrate a third embodiment of a mask in accordance with the invention incorporating concentric, opaque rings having different widths for forming tapered nozzles in a polymer nozzle member using laser ablation.
Figure 7B:
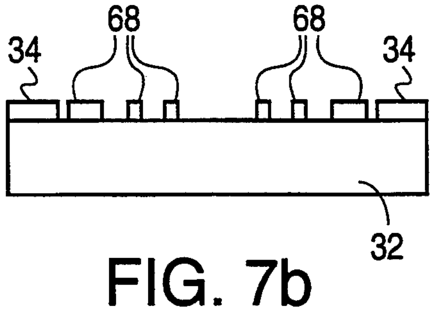

FIGS. 7*a* and 7*b* show a third embodiment of a mask 64, where mask opening 66 includes concentric rings 68 which vary in both density and width. FIG. 7*b* is a cross-section of the mask 64 of FIG. 7*a* along line 7*b*—7*b*. The action of rings 68 in forming tapered nozzles is similar to that of dots 36 in FIG. 3*a*.

Figure 8A:
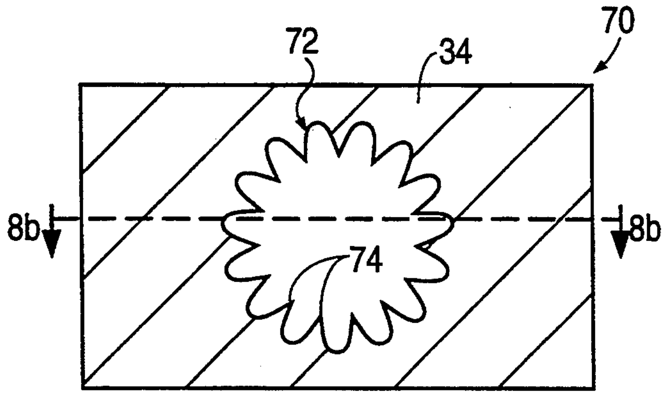
FIGS. 8*a* and 8*b* illustrate a fourth embodiment of a mask in accordance with the invention incorporating mask openings having a ruffled-shaped perimeter for forming tapered nozzles in a polymer nozzle number using laser ablation.
Figure 8B:
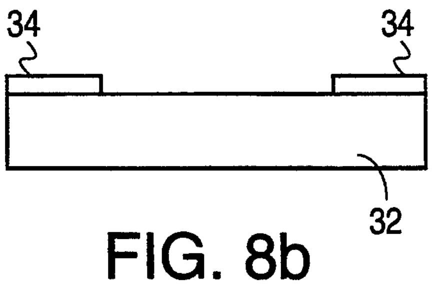

FIGS. 8*a* and 8*b* illustrate yet another embodiment of a mask 70, where a mask opening 72 has ruffled edges 74 which are preferably of a fine pitch so as not to be directly reproduced in the nozzle member. FIG. 8*b* is a cross-section of the mask 70 along line 8*b*—8*b*. The action of the ruffled edges 74 provides partial shading of the nozzle member from a radiation source to form tapered nozzles in a manner similar to the action of dots 36 in FIG. 3*a*.

Ruffled edges 74 may have virtually any geometry as long as the variable shading of the nozzle member is achieved.

A wide variety of nozzle shapes may be formed using the mask patterns shown in FIGS. 3*a*, 6*a*, 7*a*, and 8*a*.

Accordingly, an improved mask pattern and method for forming tapered nozzles in a nozzle member of a polymer material, such as a polyamide, or a photoresist material have been described.

Many other mask patterns will become obvious to those skilled in the art after reading this disclosure. This disclosure is not intended to limit the possible opaque patterns or opaque coating materials on a mask which may be used to achieve the desired nozzle tapering. Additionally, if a nozzle member formed of a negative photoresist is to be used, the mask pattern will essentially be a negative of the mask patterns shown in FIGS. 3*a*, 6*a*, 7*a*, and 8*a*, and the unexposed portions of the nozzle member will be soluble in a developing solution.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for forming tapered nozzles in a nozzle member for a printhead comprising the steps of:

interposing a mask between a radiation source and said nozzle member, said mask having nozzle defining portions corresponding to where tapered nozzles are to be formed in said nozzle member, said nozzle defining portions having opaque portions formed therein, each of said opaque portions being substantially completely opaque to radiation emitted by said radiation source, said opaque portions being distributed and arranged from a center of each of said nozzle defining portions in increasing density to a periphery of each of said nozzle defining portions; and energizing said radiation source to cause emitted radiation to impinge upon said nozzle member through said mask, said emitted radiation passing through the center of each of said nozzle defining portions completely ablating through said nozzle member, said emitted radiation being blocked by said opaque portions within said nozzle defining portions of said mask only partially ablating through said nozzle member, thereby forming tapered nozzles in said nozzle member.

2. The method of claim 1 wherein said radiation source is a laser, and said nozzle member is formed of a polymer material.

3. The method of claim 1 wherein said radiation source is a source of ultraviolet radiation, and said nozzle member is formed of a photoresist material.

4. The method of claim 1 wherein said nozzle defining portions comprise openings in said mask.

5. The method of claim 4 wherein said opaque portions comprise separate solid regions, each having approximately a same area, wherein a distribution of said solid regions increases in density toward said periphery of each of said openings.

6. The method of claim 4 wherein said opaque portions comprise separate solid regions, said solid regions having a variety of areas, wherein a sum of the areas of said solid regions at various radial distances from a center of each of said openings increases toward said periphery of each of said openings.

7. The method of claim 4 wherein said opaque portions comprise concentric opaque rings which increase in density toward said periphery of each of said openings.

8. The method of claim 7 wherein said concentric rings have a variety of widths.

9. The method of claim 4 wherein a periphery of each of said openings is formed to have a rippled pattern, wherein said opaque portions extend toward a center of said openings.

10. The method of claim 1 wherein a cross-section of each of said opaque portions is approximately at or less than an optical resolution of a lens system to be used in conjunction with said mask so as not to individually resolve said opaque portions on said nozzle member.

11. The method of claim 1 wherein a cross-section of each of said opaque portions is less than approximately 3 microns.

* * * * *

UNITED STATES PATENT AND TRADEMARK OFFICE
CERTIFICATE OF CORRECTION

PATENT NO. : 5,417,897

DATED : May 23, 1995

INVENTOR(S) : Stuart D. Asakawa et al.

It is certified that error appears in the above-identified patent and that said Letters Patent is hereby corrected as shown below:

Title page, insert item [22],
--September 19, 1994.--

Signed and Sealed this

Fifth Day of September, 1995

Attest:

BRUCE LEHMAN

*Attesting Officer* *Commissioner of Patents and Trademarks*